United States Patent [19]
Kubon

[11] Patent Number: 6,135,354
[45] Date of Patent: Oct. 24, 2000

[54] SYSTEM AND METHOD FOR FACILITATING HIGH SPEED PROCESSING OF VIDEO SIGNALS CONTAINING IMAGES OF BARCODE LABELS

[75] Inventor: Daniel G. Kubon, Peachtree City, Ga.

[73] Assignee: Label Vision Systems, Inc., Peachtree City, Ga.

[21] Appl. No.: 08/929,013

[22] Filed: Sep. 7, 1997

[51] Int. Cl.[7] ....................................................... G06K 7/10
[52] U.S. Cl. .................................. 235/462.11; 235/462.19
[58] Field of Search ..................................... 348/365, 364, 348/221, 222, 229, 207, 230, 362–369, 370–379, 473; 250/214 AG; 235/455, 462.11–462.33, 462.42–462.49, 462.07, 472.01, 437; 209/583

[56] References Cited

U.S. PATENT DOCUMENTS

| | | |
|---|---|---|
| 3,246,126 | 4/1966 | Schlieben et al. . |
| 3,774,014 | 11/1973 | Berler . |
| 3,854,035 | 12/1974 | Tyler et al. . |
| 3,868,634 | 2/1975 | Dolch .................................. 340/146.3 |
| 4,028,733 | 6/1977 | Vlicki . |
| 4,044,227 | 8/1977 | Holm et al. ........................ 235/61.7 R |
| 4,192,452 | 3/1980 | Hashimoto et al. . |
| 4,357,624 | 11/1982 | Greenberg . |
| 4,578,568 | 3/1986 | Tsuzuki . |
| 4,680,457 | 7/1987 | Robertson ............................... 235/470 |
| 4,716,397 | 12/1987 | Werba et al. . |
| 4,760,247 | 7/1988 | Keane et al. . |
| 4,806,741 | 2/1989 | Robertson . |
| 4,902,883 | 2/1990 | Poland . |
| 5,034,817 | 7/1991 | Everett, Jr. . |
| 5,073,954 | 12/1991 | Van Tyne et al. . |
| 5,103,080 | 4/1992 | Barkan . |
| 5,120,940 | 6/1992 | Willsie . |
| 5,134,272 | 7/1992 | Tsuchiya et al. . |
| 5,150,212 | 9/1992 | Han . |
| 5,159,340 | 10/1992 | Smith . |
| 5,294,783 | 3/1994 | Hammond, Jr. et al. . |
| 5,319,181 | 6/1994 | Shellhammer et al. . |
| 5,329,105 | 7/1994 | Klancnik et al. . |
| 5,756,981 | 5/1998 | Roustaei et al. . |
| 5,818,528 | 10/1998 | Roth et al. . |
| 5,864,129 | 1/1999 | Boyd . |

FOREIGN PATENT DOCUMENTS

| | | |
|---|---|---|
| 0 036 950 | 10/1981 | European Pat. Off. . |
| 56-60976 | 5/1981 | Japan . |
| 2-33685 | 2/1990 | Japan . |
| 2 167 221 | 5/1986 | United Kingdom . |

*Primary Examiner*—Karl D. Frech
*Attorney, Agent, or Firm*—Needle & Rosenberg, P.C.

[57] ABSTRACT

A barcode image processing system which processes video signals including video data representing images of barcode labels to be decoded and verified. A video signal containing video data representative of successive images of a plurality of barcode labels is processed to extract the video data and the horizontal and vertical synchronization signals from the video signal. A digitalization circuit is provided which digitalizes the video signal over a varied threshold voltage. The range or deviation of the threshold voltage which yields decodable video data is used as a measure of a quality of a barcode label. A gate trigger signal is generated which is synchronized to the vertical synchronization signal and which controls when a barcode decoder decodes video data for a horizontal line taken from a barcode image. A masking circuit is provided to mask out portions of a video field except for a portion sufficient to contain one barcode label, which is useful in the situation where barcode labels are printed very close together.

44 Claims, 7 Drawing Sheets

SYSTEM AND METHOD FOR FACILITATING HIGH SPEED PROCESSING OF VIDEO SIGNALS CONTAINING IMAGES OF BARCODE LABELS

BACKGROUND OF THE INVENTION

The present invention is directed to a video signal processing system, and more particularly to a high speed video signal processing system for decoding, verifying and reporting data related to barcode labels.

Barcode labels are widely used to track goods as they are distributed. Printing barcode labels requires high quality printing processes, which despite advancements in printing technologies, are subject to quality variations. This is particularly a concern where the printing machine prints barcode labels at very high speeds. The quality of a printed barcode label depends upon various factors including symbol contrast, decodability, modulation, edge definition, opacity and the presence of spots or voids. Poor print quality of the barcode label will cause the label to be misread or not read at all when an end user attempts to read the barcode label. Certain standards are set by the American National Standard Institute (ANSI) for the quality of barcode labels which barcode label manufacturers must follow. A grade is assigned to a barcode label by ANSI. The ANSI grade for a barcode label is based upon mathematical formulas describing parameters of a barcode label.

Accordingly, it is important to monitor the output of a high speed barcode printing machine in order to make adjustments in the printing apparatus when necessary to maintain a desirable quality or grade of the barcode labels. Traditional barcode verification systems measure the quality of a barcode image one line at a time, and thus are slow and not as accurate. A faster barcode image processing system which decodes and verifies barcodes using a video signal has been developed, and is the subject of commonly assigned U.S. patent application Ser. No. 08/486,159, filed Jun. 7, 1995, now U.S. Pat. No. 5,682,030.

The present invention is directed to improvements in a barcode image processing system to enable very high speed processing of data representing images of barcode labels and/or to objectively measure the quality of a barcode label in real time.

SUMMARY OF THE INVENTION

Briefly, the present invention is directed to a video processing system having several features to enhance the processing speed of barcode images. The video processing system processes video signals which include video data representing images of barcode labels to be decoded and verified. A video processing module is provided which receives a video signal containing video data representative of successive images of a plurality of barcode labels. The video processing module extracts the video data and the horizontal and vertical synchronization signals from the video signal. A digitalized video data signal is generated as output by the video processing module.

A data processing module is provided which receives the vertical and horizontal synchronization signals and the digitalized video signal from the video processing module. The data processing module includes a decoder which decodes the video data representing a reflectance profile for a horizontal line of the video signal. In addition, the data processing module includes a control logic circuit which generates a plurality of control signals to control how a video signal is processed.

The objects and advantages of the present invention will become more readily apparent when reference is made to the following description taken in conjunction with the accompanying drawings.

DETAILED DESCRIPTION OF THE DRAWINGS

Figure 1:
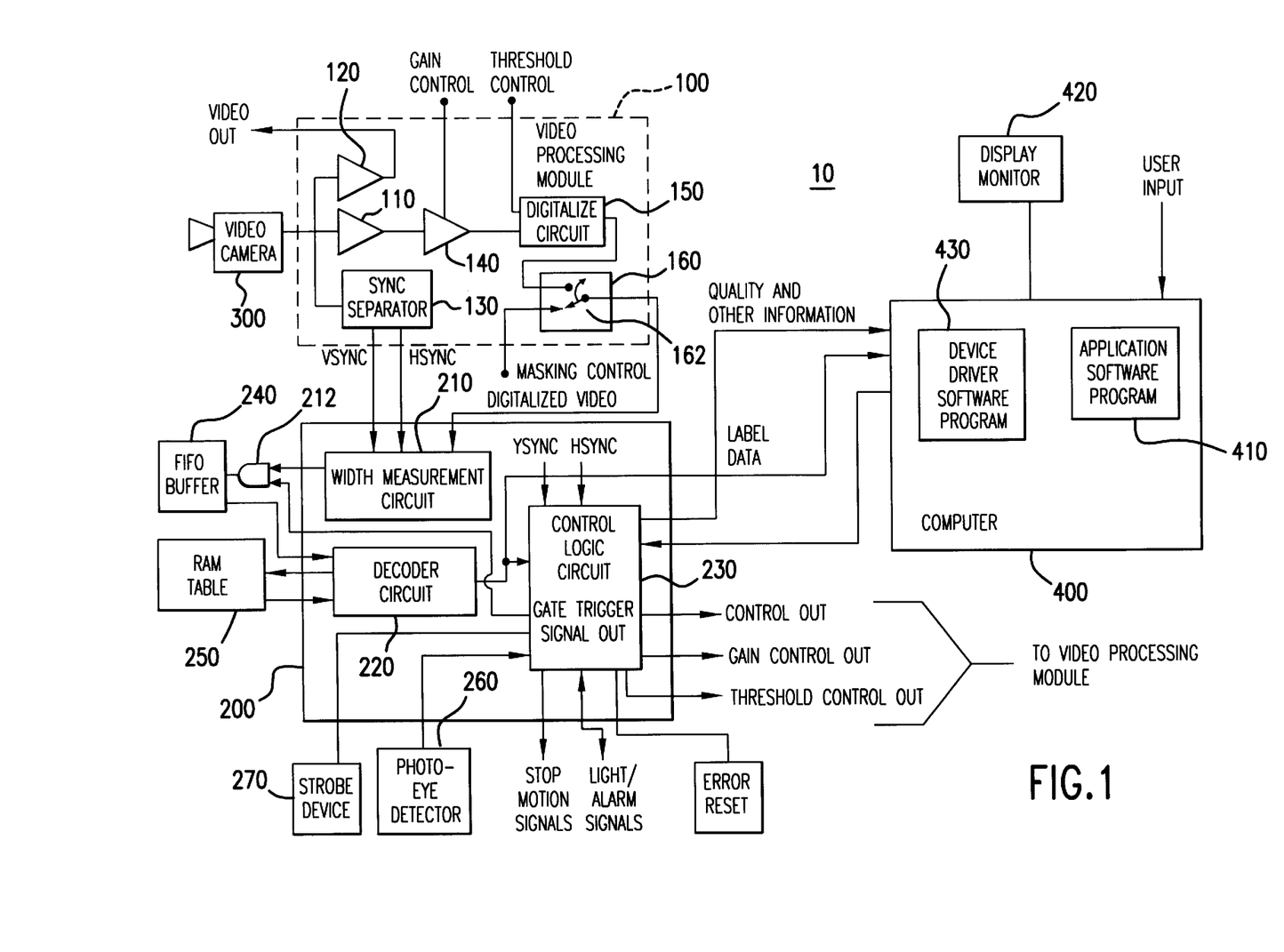
FIG. 1 is a block diagram of a barcode image processing system for processing video signals containing images of barcode labels according to the present invention.

Referring first to FIG. 1, the barcode image processing system 10 comprises a video processing module 100 and a data processing module 200. The video processing module 100 receives as input a video signal from a video camera 300, or from any source of a standard video signal, such as a video signal source broadcast by a television station, played back from a video tape, or received form any other video source. In a preferred embodiment, the video signal complies with any video standard, such as NTSC, RS170, PAL, CCIR, SECAM, etc. In the United States, the NTSC standard is widely used for the distribution of television signals, while in Europe the PAL standard is widely used.

The following description makes frequent reference to parameters of the NTSC standard video signal, which comprises a one volt peak-to-peak signal and a scan rate of approximately 15,750 horizontal lines per second. It should be understood by one of ordinary skill in the art that the present invention may be implemented in conjunction with any type of video signal, so long as video data is communicated on a line-by-line basis. An NTSC video camera collects data during an integration time and takes 16.67 msec to output the corresponding video signal. The video processing system 10 collects and outputs data every 16.67 msec without the use of "capture data" or "freeze frame" techniques which are slower and more expensive than the system according to the present invention.

The data processing module 200 receives as input various signals generated by the video processing module 100, and in turn generates control signals for controlling the video processing module 100.

The video processing system 10 may interface with a computer 400 via a device driver 500. The computer 400 may include an application software program 410 stored in its random access memory (RAM) that receives label data and other information from the video processing system 10 for graphical display on a display monitor 420. A device drive software program 430 controls the exchange of information between the application software program 410 and the data processing module 200. In addition, the application software program 420 receives user input to adjust certain parameters of the video processing system 10. Control signals are generated by the computer 400 under control of the application software program 410 and are coupled through the device driver software program 430 to the video processing system 10. The computer 400 is, for example, a personal computer having a Pentium™ processor running a Windows™ operating system.

More specifically, the video processing module 100 receives a video signal, such as an NTSC video signal, from the video camera 300 and processes the video signal including a horizontal synchronization signal (HSYNC) and a vertical synchronization signal (VSYNC). The video camera 300 views a series of barcode labels to be verified and the video signal generated by the video camera 300 contains video data representative of successive images of a plurality of barcode labels as they are passed on a web into the field of view of the video camera 300. The video processing module 100 comprises a first video amplifier 110 connected to the output of the video camera 300 to receive as its input the video signal output by the video camera 300. The video signal is also connected to a second video amplifier 120 and to a sync separator circuit 130. The output of the first video amplifier 110 is connected to a gain controlled amplifier 140. The gain of the gain controlled amplifier 140 is adjusted in response to a gain control signal generated by the data processing module 200. The output of the gain controlled amplifier 140 is connected to one input of a digitalization circuit 150. The other input of the digitalization circuit 150 is connected to a threshold signal generated by the data processing module 200. Finally, the output of the digitalization circuit 150 is connected to one input of a masking circuit 160. The other input of the masking circuit 160 is connected to a masking control signal, also generated by the data processing module 200.

The first video amplifier 110 amplifies the video signal for subsequent processing. The second video amplifier 120 amplifies the video signal to a suitable level for output to a video monitor, for example. The gain controlled amplifier 140 further amplifies the video signal by an amount controlled by the gain control signal. The purpose of the gain controlled amplifier 140 is to adjust the maximum AC level (analog portion) of the video signal to a substantially constant level suitable for further processing. Depending on the contrast level of a barcode label, the video signal may need to be boosted an additional amount in order to bring it to the level suitable for further processing. The output of the gain controlled amplifier 140 is an adjusted video signal.

The digitalization circuit 150 generates a digitalized video data signal for each horizontal line of a video frame. The masking circuit 160 is, for example, an electronic switch 162, such as a CD4066 switch manufactured by Harris Corporation, which is closed when the masking control signal is in one state, and opened when the masking control signal is in another state. This effectively masks a portion of a video frame and unmasks or "cloaks" a portion corresponding to a number of horizontal lines in which an image of a single barcode label may reside. Consequently, the masking circuit 160 ensures that video data representing only one barcode label is processed for each video frame. The output of the masking circuit 160 is a plurality of digitalized video data signals corresponding to those horizontal lines of a video frame which are unmasked. A further explanation of the digitalization circuit 150 and masking circuit 160 will be provided hereinafter.

The data processing in real time module 200 comprise several circuits for processing the digitalized video data signal output by the video processing module 100. The various circuits of the data processing module 200 may be implemented in many ways. One such implementation according to a preferred embodiment is in a field programmable gate array (FPGA). The data processing module 200 comprises a width measurement circuit 210, a decoder circuit 220 and a control logic circuit 230. The data processing module 200 receives as input VSYNC, HSYNC and the digitalized video data signal for each (unmasked) horizontal line. VSYNC and HSYNC are coupled to the width measurement circuit 210 and to the control logic circuit 230. The data processing module 200 is capable of decoding, verifying and reporting data for images of up to 60 barcode labels per second (the entire height of the label and not just a few horizontal lines) using a standard NTSC video signal. The barcode image processing system 10 can accept and process video signals at even faster rates, such as 200 fields per second from a fast video camera system. The functions of the circuits of the data processing module 200 may also be implemented in one or more microprocessors(s) or application specific integrated circuits (ASICs).

The output of the width measurement circuit 210 is coupled to one input of an AND gate 212. The other input to the AND gate 212 is a gate trigger signal generated by the control logic circuit 230. The AND gate 212 controls when the digitalized video data signals are coupled to a first-in-first-out (FIFO) buffer 240. Other electronic devices are suitable for the AND gate 212, such as an electronic switch or gate device. The FIFO buffer 240 temporarily stores the digitalized video data signals corresponding to horizontal lines that are suspected of representing barcode data. The decoder circuit 220 reads the digitalized video data signals from the FIFO buffer 240 and decodes them on the basis of barcode label data stored in the random access memory (RAM) table 250. The FIFO buffer 240 has a storage capacity suitable for storing digitalized video data signals for one horizontal line. The corresponding label data is output by the decoder circuit 220, if the digitalized video data signal is decodable. A decode success signal indicating that the digitalized video data signal is decodable is coupled to the control logic circuit 230, for reasons to be explained hereinafter.

The control logic circuit 230 receives as input signals from other sources. It is the control point for the system 10 and controls the operation of the various circuits in the video processing module 100 and data processing module 200. In particular, the control logic circuit 230 receives a registration signal which indicates the presence of a barcode label in the field of view of the video camera 300. One type of registration technique is responsive to a photo-eye signal input to the control logic circuit 230 from a photo-eye detector 260 positioned a predetermined distance "upstream" from the field of view of the video camera. The photo-eye detector 260 detects a registration mark for a barcode label that is to be imaged by the video camera.

Another technique to register the presence of a barcode label is to couple to the control logic circuit 230 a pulse generator which generates a pulse at a predetermined frequency. The control logic circuit 230 counts the pulses which occur between the issuance of a good label signal generated by the control logic circuit 230 when a good label is determined to have been processed. The number of pulses which occur between successive good label signals will be regular assuming that the barcode labels are printed or consistently spaced on a web. Thus, the control logic circuit 230 can synchronize the generation of certain signals to the detection of a predetermined number of pulses between successive good label signals. Any deviations in the pulse count due to slippage or print quality will update the control logic circuit with a new predetermined pulse count if the deviation is within a predetermined percentage (10%, for example) of the previous predetermined pulse count.

Still another technique to register the presence of a barcode label is to count pulses from the pulse generator between pulses in the photo-eye signal. This technique eliminates missing a registration mark, which is common for a photo-eye detector. The control logic circuit 230 triggers the timing of events in response to counting a predetermined number of pulses from a previous photo-eye signal, regardless of whether a subsequent photo-eye signal is received.

Regardless of the registration technique employed, the control logic circuit 230 controls a strobe device 270. The strobe device 270 is responsive to a strobe trigger signal generated by the control logic circuit 230, which causes the strobe device 270 to flash and illuminate a barcode for view by the video camera 300.

The control logic circuit 230 is optionally connected to a barcode label printing machine that prints and outputs a web containing barcode labels to be verified. In particular, the control logic circuit 230 may generate stop motion signals to cause the printing machine to stop running. It may also output audible or visual alarm signals for situations where a read error, grade error, sequence error, mismatch error, bar growth error, and bar shrinkage error are detected. It also may output signals for good label indications and alarm signals indicating that a barcode label was missed. This information is coupled to the application software program 410 and displayed in a graphical user interface to a user. Finally, in the event that a barcode verification procedure must be terminated, the control logic circuit 230 resets in response to an error reset signal generated by an error reset or clear button. Information regarding the quality of a barcode label as well as other the various errors that can be detected is also reported to the computer 400 by the control logic circuit 230.

The control logic circuit 230 generates as output a gate trigger signal which is connected to the AND gate 212, a strobe trigger signal which is coupled to the strobe device 270, a masking control signal which is coupled to the masking circuit 160, a gain control signal which is coupled to the gain controlled amplifier 140 and a threshold control signal which is coupled to the digitalization circuit 150.

Figure 2:
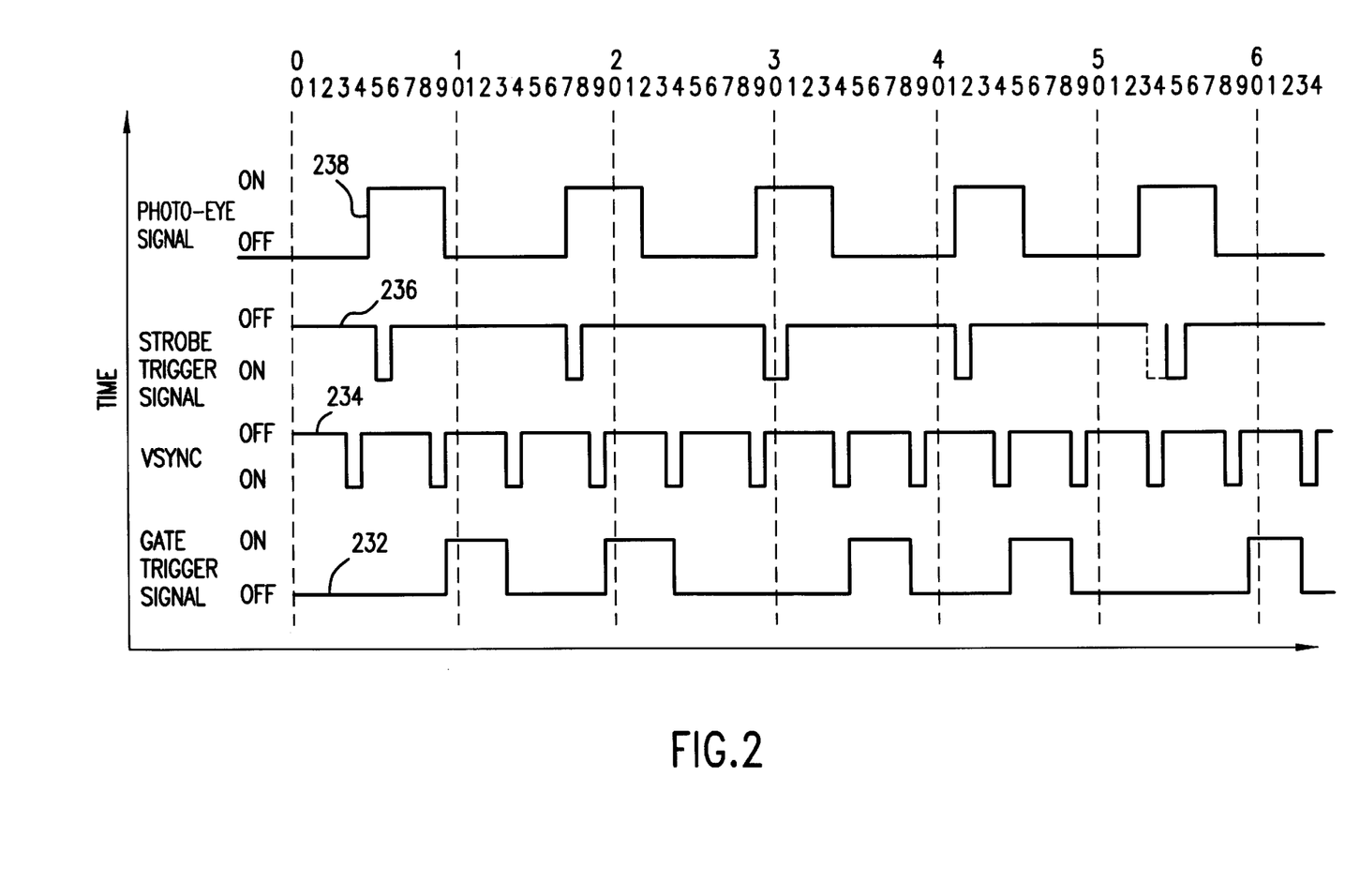
FIG. 2 is a timing diagram showing a timing relationship of gate trigger photo-eye (registration), vertical sync and strobe trigger signals according to the present invention.

Turning to FIG. 2, the operation of the control logic circuit 230 to generate the gate trigger signal and the strobe trigger signal will be described. The control logic circuit 230 generates the gate trigger signal to control when the decoder circuit 220 reads data from the FIFO buffer 240. The gate trigger signal is shown at reference numeral 232 and takes on either of two states, ON (high) or OFF (low). The gate trigger signal 232 is generated primarily on the basis of, and synchronized to, the vertical synchronization signal VSYNC, which is shown at 234. As is well known in the art, a VSYNC pulse is generated during the vertical blanking interval of an NTSC video signal to indicate the end of one video field and the beginning of the next video field. A NTSC video field comprises 255 horizontal lines that are synchronized with 255 HSYNC pulses. VSYNC comprises a pulse every 16.67 msec, with each pulse indicating the start of a new field of video data. The duration of one horizontal line is 63.5 microseconds. A VSYNC pulse is generated at the end of every field and at the end of every frame. A frame comprises two fields.

The strobe trigger signal is shown at reference numeral 236 and causes the strobe device 270 to flash when ON. The photo-eye signal (registration signal) is shown at reference numeral 238 and is ON when the photo-eye detector 260 detects a registration mark for a label, and is otherwise OFF.

The control logic circuit 230 synchronizes the gate trigger signal 232 and the strobe trigger signal 236 to the pulses in VSYNC. Normally, the control logic circuit 230 generates an ON pulse in the strobe trigger signal in response to detecting the rising edge of the photo-eye signal 238, corresponding to the beginning of a barcode label in the camera's field of view. However, the situation will arise when the rising edge of the photo-eye signal will coincide with a VSYNC pulse. If the strobe trigger signal 236 is ON during a VSYNC pulse, then integration of the image by the video camera would be very dim or nonexistent. Integration is the period of time that the video camera accepts images of light on its charged coupled device chip. The strobe trigger signal 236 must go ON after a VSYNC pulse and certainly before the next VSYNC pulse in order to avoid poor image integration. Therefore, the control logic circuit 230 registers the occurrence of the rising edge of the photo-eye signal 238. If the next VSYNC pulse is due to coincide with the strobe trigger signal (the rising edge of the photo-eye signal 238), the ON pulse of the strobe trigger signal 236 is delayed until immediately after the next VSYNC pulse. This situation is shown in the example of FIG. 2, at time T=53, when a VSYNC pulse coincides with what should be an ON pulse of the strobe trigger signal 236. Rather than triggering the strobe device at the same time as the VSYNC pulse, as shown by the ON pulse in phantom, the control logic circuit 230 delays it until time T=54 when the VSYNC pulse is completed.

The gate trigger signal 232 is also synchronized to VSYNC so that it cannot go ON in response to the strobe trigger signal 236 until the next full video field, signified by a VSYNC pulse. For example, with reference to FIG. 2, at time T=5 to T=6, the strobe trigger signal 236 is ON. The control logic circuit 230 registers this, but delays the ON pulse of the gate trigger signal 232 until after the next VSYNC pulse signifying the next video field. This occurs at time T=9 through T=14, to prevent it from overlapping with the VSYNC pulse at time T=8. The duration of the ON pulse of the gate trigger signal is equal to a time duration of an entire video field 16.67 msec, which is spanned by a time interval between successive VSYNC pulses. Thus, the output from the width measurement circuit 210 is ANDed with the gate trigger signal 232 so that the video data is output to the FIFO buffer 240 for storage only when the gate trigger signal is ON. When the gate trigger signal 232 is OFF, no data is loaded into the FIFO buffer 240 from the width measurement circuit 210. The decoder circuit 220 reads and decodes the digitalized video data from the FIFO buffer 240 on a real time basis. Once video data is clocked into the data processing module 200, it takes 5–10 nanoseconds to process one horizontal line of video data and to output corresponding label data.

As described above, the gate trigger signal may alternatively control an electronic switch (rather than an AND gate) whereby the switch closes in response to the gate trigger signal, coupling video data from the width measurement circuit 210 to the FIFO buffer 240.

By synchronizing the release of digitalized video data signal from the width measurement circuit 210 to be decoded by the decoder circuit 220, the need for more expensive "freeze frame" or "bit mapping" circuits is eliminated. The decoder circuit 220 can decode the digitalized video data signal supplied by the video camera, without interruption.

Figure 3:
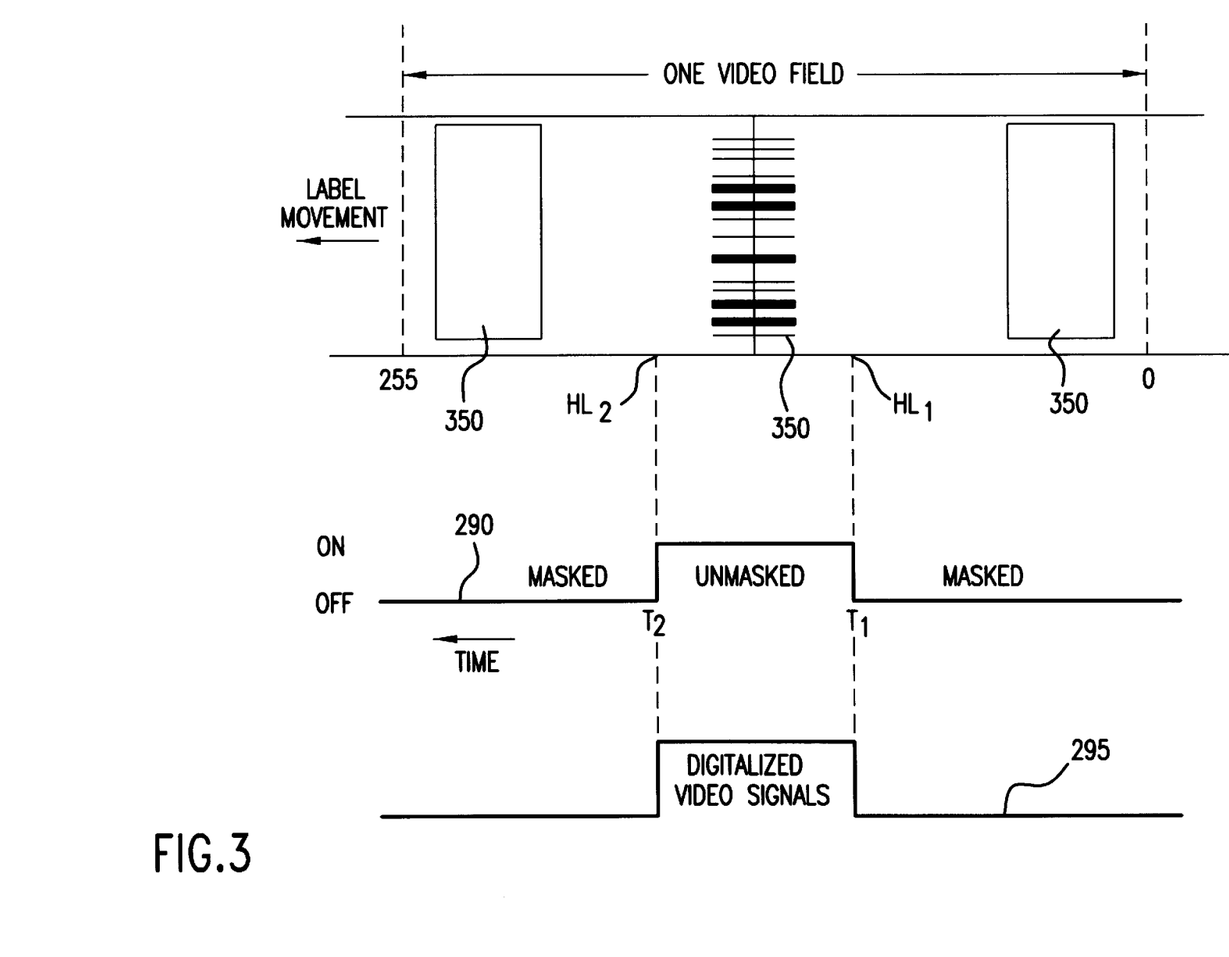
FIG. 3 is a timing diagram showing the generation of a masking control signal according to one aspect of the present invention.

Turning to FIG. 3, the operation of the masking control circuit 160 to generate a masking control signal shown at reference numeral 290 will be described. The purpose of the masking control circuit 160 is to control which portion of a video data is processed by the data processing module 200. An entire NTSC video field comprises 255 horizontal lines. Barcode labels are shown at reference numeral 350. In some cases, barcode labels are printed very close together on a web, as close as 1/16 inch. Consequently, it is possible that more than one barcode label may come into one video field of view of the video camera. For example, in FIG. 3 three barcode labels 350 are shown in one video field due to their close spacing. If the data in this field were processed, there would be no way to distinguish video data for one barcode label from video data for another barcode label. Accordingly, the video processing system 10 allows for masking of the video data associated with one video field so as to process only video data for a portion of the video frame which can be occupied by a single barcode label. For example, as shown in FIG. 3, when it is determined that there are multiple barcodes in one video field, the video camera is aligned to confine one barcode label to a portion of the video field between horizontal line HL1 and horizontal line HL2, for example. The image of a barcode label can be displayed on the video camera while the web is stopped. This user can input through the computer 400 "upper cloak" and "lower cloak" alignment data, where the lower cloak point is horizontal line HL1 and the upper cloak point is horizontal line HL2. The application software program will display an image of the camera field of view with a single barcode label unmasked in order to verify the alignment data. The control logic circuit 230 generates the masking control signal 290 so that it is ON during the unmasked or cloaked period corresponding to the time period between T1 to T2, and otherwise it is OFF, inhibiting output of the video signal for horizontal lines at all other times during a corresponding time period.

The control logic circuit 230 generates the masking control signal 290 on the basis of the VSYNC and HSYNC signals supplied from the video processing module 100 and the user input data specifying the masking or cloaking limits. More specifically, the control logic circuit 230 counts horizontal lines in order to cause the masking control signal 290 to be ON and OFF at the proper time intervals based on the masking limits. In operation, the electronic switch 162 (FIG. 1) of the masking control circuit 160 is closed when the masking control signal 290 is ON and is open when the masking control signal is OFF. As a result, the digitalized video data signal generated by the digitalization circuit 150 will be masked (not output) for those horizontal lines outside of the unmasked period of the masking circuit 160, as shown by the timing signal at reference numeral 295.

Figure 4:
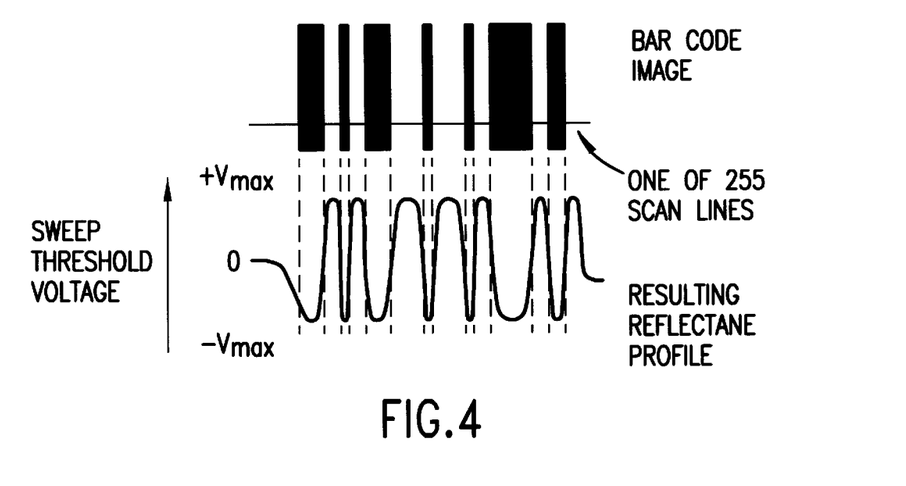
FIG. 4 illustrates a barcode image and a corresponding reflectance profile for an exemplary horizontal line of the barcode image, and showing the basis for a barcode verification and grading technique of the present invention.
Figure 5:
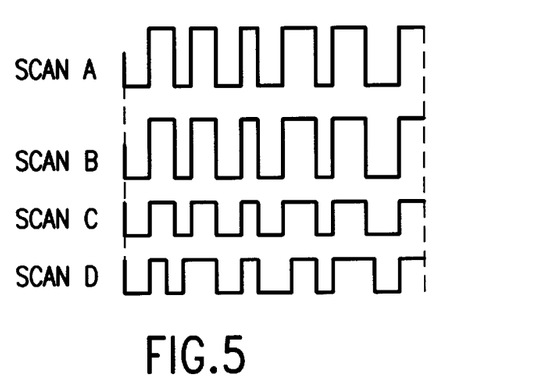
FIG. 5 illustrates digitalized video data signals for multiple horizontal lines each at a different DC threshold voltage, in accordance with the barcode verification and grading technique according to the present invention.
Figure 6:
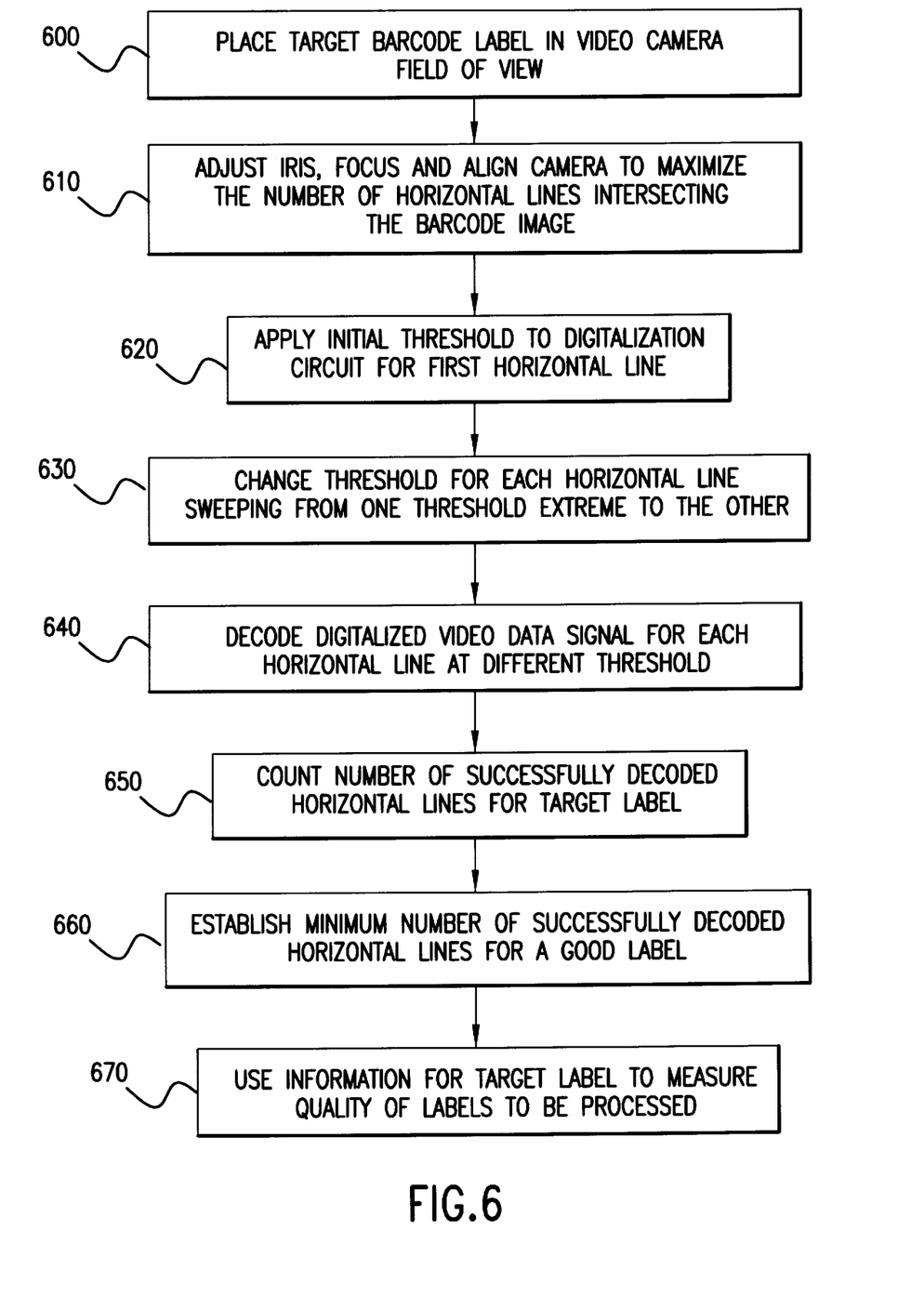
FIG. 6 is a flow chart showing the process for determining the deviation of a DC threshold voltage, as indicative of the contrast quality of a barcode label.

Turning now to FIGS. 4–6, the barcode label verification and grading technique according to the present invention will be described. FIG. 6 is a flow chart showing the step by step process performed by the control logic circuit 230 and the digitalization circuit 150 to verify and grade barcode labels. The digitalized video data signal for a barcode label is generated as output by the digitalization circuit 150 using a DC threshold voltage controlled by the control logic circuit 230. The digitalization circuit 150 is a high speed comparator with a variable DC threshold input that is controlled to vary the threshold control signal generated by the control logic circuit 230. The barcode label verification and grading technique is based on the recognition that the quality of a barcode label can be measured in terms of a deviation of the DC threshold voltage of the digitalization circuit 150. That is, the amount of deviation from a global threshold for a reflectance profile of a barcode label is indicative of the quality of the barcode label, and is useful in assigning an ANSI grade to a barcode label image. FIG. 4 shows a reflectance profile of one exemplary horizontal line of a barcode label image.

Initially, in steps 600–670, data must be generated to establish parameters for a "normal" or acceptable barcode label image. This is called an "optimization" procedure. An ANSI grade "A" barcode label is selected as a "target" label to determine these parameters. In step 600, the target label is placed in the field of view of the video camera. The iris, focus and alignment of the video camera is adjusted in step 610 to maximize the number of horizontal lines intersecting the barcode image in the field of view of the video camera. The application software program 410 prompts a user to "optimize" the image. At this time, video data representing the barcode image is collected by the video camera during an integration period, and this data is clocked out of the video camera in 16.67 msec.

In step 620, the control logic circuit 230 applies a threshold control signal to the threshold input of digitalization circuit 150 to start digitalizing the first horizontal line at an initial DC threshold voltage. The initial DC threshold voltage is either a positive maximum (+Vmax) or negative maximum (−Vmax) DC voltage suitable for a barcode image. For example, the initial DC threshold voltage is +2.5 V (or −2.5 V), where the video signal is centered at 0 V. For each new horizontal line of video data, the DC threshold voltage supplied to the digitalization circuit is changed by a predetermined increment, such as 50 mV.

In step 630, as each horizontal line of video data is received by the digitalization circuit 150, the threshold control signal generated by the control logic circuit 230 causes the DC threshold voltage to change to a new level. FIG. 4 shows that the threshold voltage is changed with respect to a reflectance profile for each horizontal line of the barcode image. The digitalization circuit 150 compares the voltage level of the video signal output by the gain controlled amplifier 140 with the DC threshold voltage and generates as output a digitalized video data signal for each horizontal line. FIG. 5 shows the digitalized video data signal output by the digitalization circuit 150 for four different good contrast quality horizontal lines, each generated at different DC threshold voltages. The digitalized video data signal for each horizontal line should not be significantly different (in peak amplitude) if the barcode label is of good quality. A good ANSI grade "A" barcode label will have a decodable digitalized video data signal at any DC threshold voltage from the top to the bottom of its reflectance profile.

The digitalized video data signal is stored in the FIFO buffer 240 to be decoded by the decoder circuit 220. In step 640, the decoder circuit 220, with the assistance of the RAM table 250 decodes the digitalized video data signal. If the decoder circuit 220 is able to decode it, it outputs corresponding label data and a decode success signal to the control logic circuit 230 indicating that the digitalized video data signal is decodable. If the decoder circuit 220 is not able to decode it, then a decode success signal is not issued to the control logic circuit 230. The number of decode success signals is counted for the entire video field by the control logic circuit 230 in step 650 for the target label. This optimization process takes approximately 10 seconds. The data processing module 200 determines and stores several important characteristics of the target barcode, including the number of horizontal lines per field that were decodable, the corresponding DC threshold voltage deviation, and the global threshold. A minimum number of "good" (successfully decoded) horizontal lines for the target label is established in step 660, based on the information determined for a target label. The deviation of the DC threshold voltage corresponding to the number of "good" horizontal lines is a measurement of the barcode label quality. Also, during the optimization process, the control logic circuit 230 examines the deviation of the DC threshold and determines an overall amplitude of the image of the target label, which is an indication of the overall contrast level of the target label. The gain control signal used to adjust the gain of the gain controlled amplifier 140 is generated by the control logic circuit on the basis of the overall amplitude of the target label image. As a result, when processing a web of barcode labels similar to the target label, the gain of the gain controlled amplifier 140 is set to the gain value determined during the optimization procedure so that an amplitude deviation (measured in voltage amplitude) between peaks (corresponding to white spaces in the barcode) and valleys (corresponding to black spaces in the barcode) of the video signal is at a suitable level for processing, regardless of any external variables. For example, it has been found that 5.1 V AC is a suitable amplitude deviation for a video signal at the output of the gain controlled amplifier 140.

After the optimization process is performed in steps 600–660, the threshold deviation, measured in terms of the number "good" horizontal lines, is used as a standard for measuring the quality of (newly printed and yet to be verified) barcode labels which are similar to the target label. In particular, the deviation or sweep of the DC threshold voltage for which the digitalized video data can be decoded is used as a tool to assign an ANSI grading to barcode labels. In step 670, when processing video data generated from a barcode image, the threshold voltage of the digitalization circuit 150 is varied between +Vmax to −Vmax and the number of "good" horizontal lines of the barcode image are counted and compared with the predetermined information collected from a target label in order to assign an ANSI grade to the barcode image. For example, a typical number of "good" horizontal lines would be 140 for a 0.9 inch UPC barcode label. If less than 140 "good" horizontal lines are counted for a barcode image, it cannot receive an ANSI grade of "A", but perhaps a lesser ANSI grade. The control logic circuit 230 also computes the global threshold for each barcode label, which is the voltage equidistant between the maximum DC threshold voltage that yielded decodable data and the minimum DC threshold voltage that yielded decodable data. By the time the NTSC video signal is retraced to the start of the next horizontal line, all decoding and verification has been performed on the previous horizontal line and the system is waiting for the next input of a digitalized video data signal. Thus, the processing occurs in real time.

Figure 7:
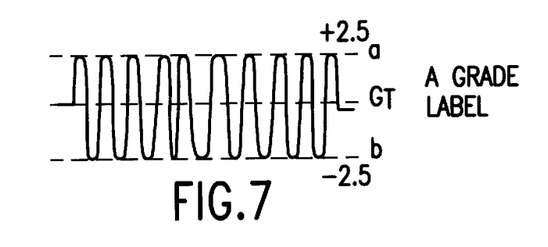
FIG. 7 shows a DC threshold voltage deviation of a reflectance profile for a good contrast quality barcode label.
Figure 8:
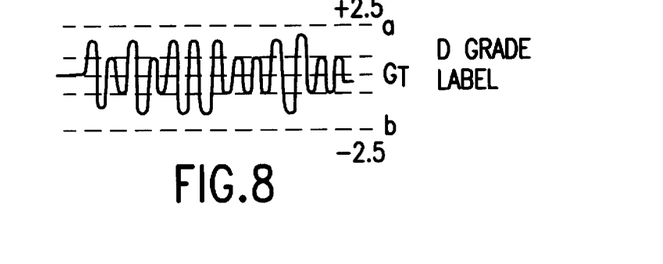
FIG. 8 shows a DC threshold voltage deviation of a reflectance profile for a poor contrast quality barcode label.

FIG. 7 shows an example of a deviation for an ANSI grade A label and FIG. 8 shows an example of a deviation for an ANSI grade D label. The greater the number of "good" horizontal lines, the greater the corresponding deviation. The A grade barcode label has "good" horizontal lines between points DC threshold voltages between points "a" and "b", which corresponds to a significantly wide window. Thus, the A grade label has a wide window of decodability. The D grade label has very few "good" horizontal lines and thus the deviation measured by the distance between points "a" and "b" is very small. The D grade label has a very narrow window of decodability. A set of ranges is established for the deviation in order to assign an ANSI grade of A, B, C, D E or F to a barcode label. In addition, the control logic circuit 230 generates a good label signal if the number of decode success signals counted for a barcode image is greater than a predetermined number, as well as a quality measurement signal indicating the ANSI grade of a barcode label that is displayed in a scrolling chart by the application software program 410.

If a barcode label contains a spot or void, then the system will not recognize the digitalized video data signal for a horizontal line through that void as a "good" horizontal line. In particular, any spot or void greater than 0.006 inches in bar height will be detected. If a barcode label contains too many spots or voids collectively, then its deviation will be small, affecting its ANSI grade accordingly. If a barcode label has poor edge definition, then the reflectance profile at the extremes peaks will cause the corresponding digitalized video signal to be undecodable.

If a barcode image has poor opacity then the reflectance profile will be severely distorted at its peaks. Consequently, only DC threshold voltages in the center of the reflectance profile of the barcode image will generate "good" (decodable) digitalized video data signals.

Figure 9:
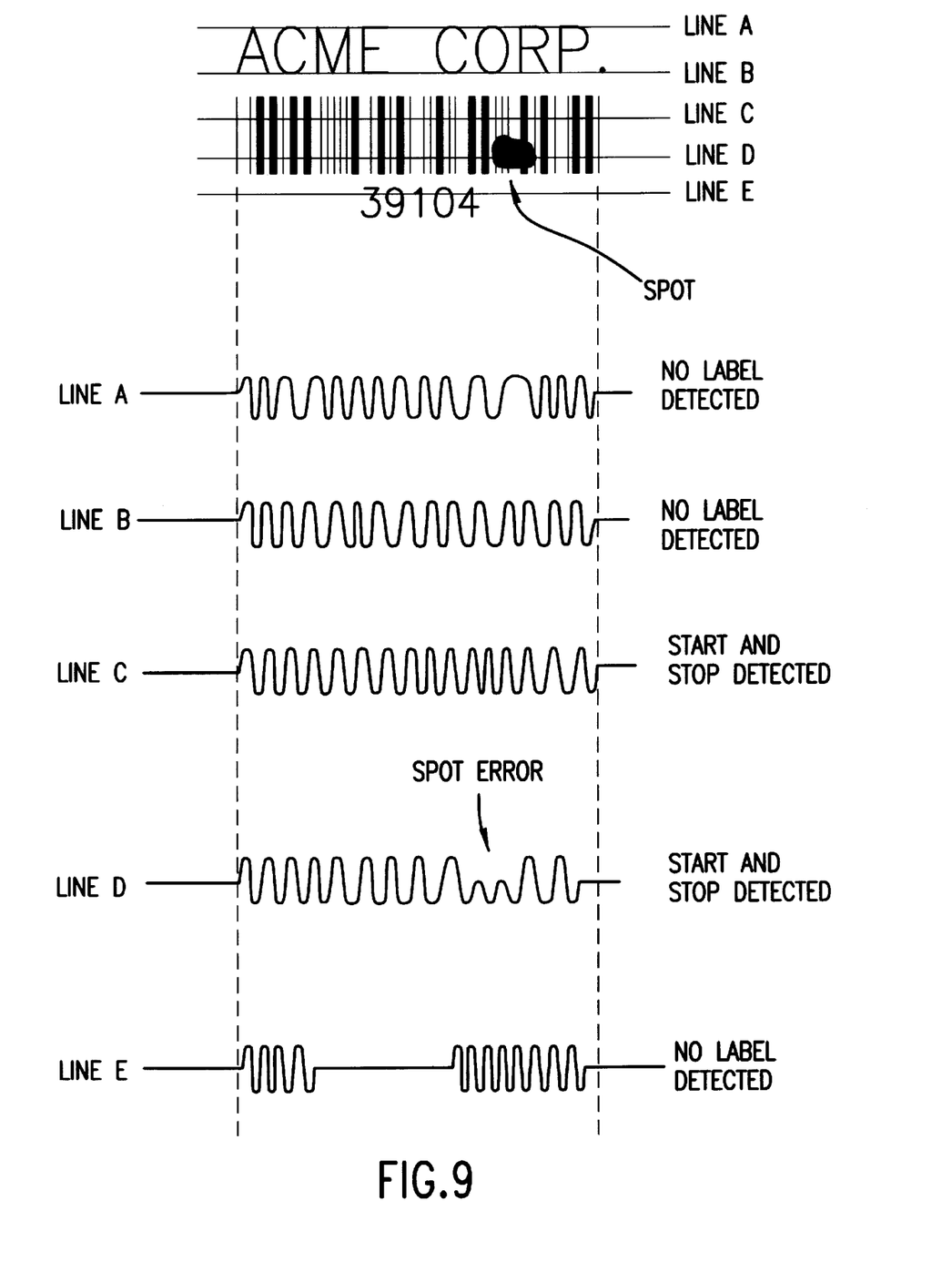
FIG. 9 is a diagram showing a barcode label and video signals for several horizontal lines through the barcode label in accordance with a width measurement filtering technique of to the present invention.
Figure 10:
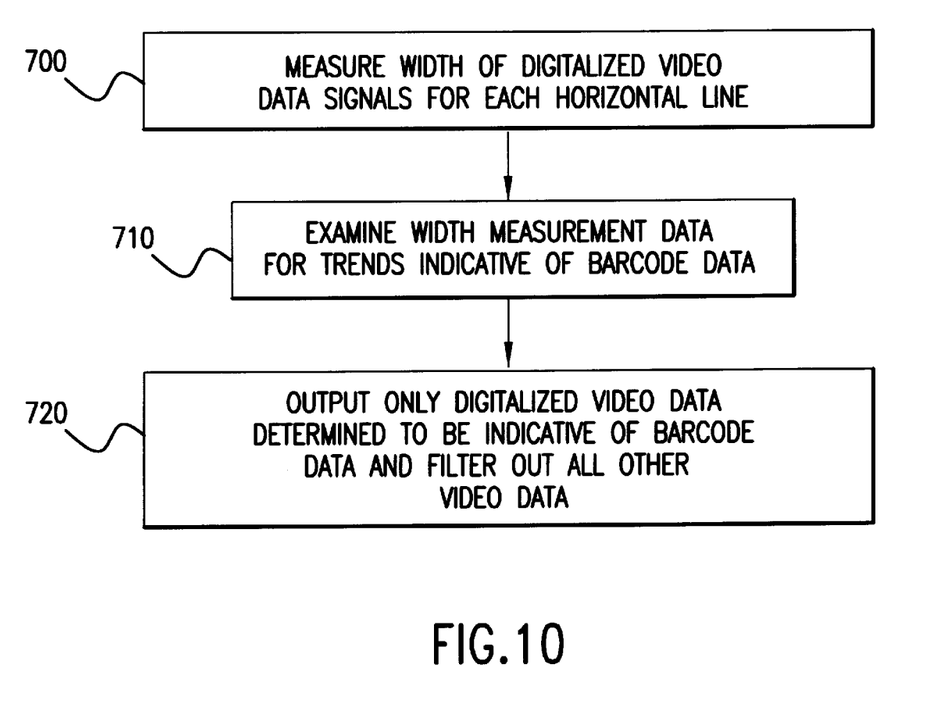
FIG. 10 is a flow chart showing the process for the width measurement filtering technique according to the present invention.

Referring to FIGS. 9 and 10, the operation of the width measurement circuit 210 and the control logic circuit 230 in inspecting the digitalized video data signal will be described. The width measurement circuit 210 receives as input digitalized video data signals output by the digitalization circuit 150 (if not masked by the masking circuit 160) and acts as a filter to output only those digitalized video data signals determined to correspond to true barcode image data. In step 700, the width measurement circuit 210 measures the width between peaks of a digitalized video data signal. In step 710, the width measurement data is examined for trends in consistency that are indicative of a barcode label. More specifically, the width measurement circuit 210 measures the width of spaces between peaks (quiet zones) in the digitalized video data signal and determines whether the spaces are indicative of start characters, stop characters and other widths typical of barcode data. This enables a distinction to be made between barcode data and non-barcode data such as artwork and printed material around a barcode label. For example, horizontal lines A, B and E in FIG. 9 are taken through the text printed on the barcode label. The digitalized video data signals for these horizontal lines are not classified as barcode label data because they lack the width characteristics of barcode data. In step 720, the width measurement circuit 210 outputs to the FIFO buffer 240 only the digitalized video data signals which are determined to correspond to barcode data. The digitalized video data signal for horizontal line C would be output by the width measurement circuit 210, but would not for lines A, B and E. The digitalized video data signal for horizontal line D will also be output to the FIFO buffer 240. Any errors caused by spots in the barcode label (such as those in line D) will be detected subsequently by the decoder circuit 220 if the decoder circuit is unable to decode the digitalized video data signal.

Consequently, the decoder circuit 210 will decode only those digitalized video data signals that are indicative of barcode data. The decoder circuit 210 will not spend processing time decoding information other than digitalized video signals truly representative of a barcode data.

The video processing system according to the present invention is capable of decoding 60 barcode images per second. A typical UP barcode is 0.900 inches in height and the barcode image occupies approximately 100 horizontal lines. Data for these 100 horizontal lines is processed every 16.67 seconds (the duration of one NTSC video frame). This is equals 5,999 decode per second. The scan reflectance profile of every 0.02 inch of bar height is processed.

The barcode image processing system 10 reports data to a user through the application software program 410, including alarms for missing labels, alarms for detecting labels of a certain ANSI grade or grades, bar growth and shrinkage information, number of labels decoded per second, number of errors detected, etc.

The above description is intended by way of example only and is not intended to limit the present invention except as set forth in the following claims.

What is claimed is:

1. A system for processing video signals representing barcode labels, the system comprising:
   a video camera positioned to view a moving web carrying a plurality of barcode labels disposed thereon and which outputs a video signal;
   a strobe device positioned to illuminate a field of view of the video camera;
   a sync separator circuit receiving as input the video signal output from the video camera and extracting therefrom a vertical synchronization signal which comprises a sequence of pulses occurring at a predetermined frequency, each pulse representing a start of a video field of the video signal;
   a detector to detect a barcode label approaching the field of view of the video camera and generating as output a registration signal indicative thereof;
   a control circuit coupled to the sync separator circuit, to the detector and to the strobe device, the control circuit receiving as input the vertical synchronization signal and the registration signal output from the detector and generating a strobe trigger signal timed with respect to pulses in the vertical synchronization signal so as to cause the strobe device to flash at a time coincident with a next available video field integration period of the video camera.

2. The system of claim 1, wherein the control circuit is responsive to the registration signal to generate a pulse in the strobe trigger signal which causes the strobe device to flash, the control circuit delaying the pulse in the strobe trigger signal until after a pulse in the vertical synchronization signal if a pulse in the strobe trigger signal would otherwise cause overlap of the video camera integration period with a pulse in the vertical synchronization signal.

3. The system of claim 1, and further comprising a digitalization circuit having a first input to receive the video signal output by the video camera and a second input for receiving a threshold, the digitalization circuit comparing a level of the video signal with the threshold and generating as output a digitalized video data signal.

4. The system of claim 3, and further comprising a gate having a first input coupled to receive the digitalized video data signal and a second input coupled to receive the gate trigger signal, and an output, the gate being responsive to the gate trigger signal to couple video data to its output, wherein the control circuit generates a pulse in the gate trigger signal which causes the gate to output the digitalized video data signal while the pulse in the gate trigger signal is present and otherwise not outputting the digitalized video data signal, the control circuit generating the pulse in the gate trigger signal in response to and immediately subsequent a pulse in the vertical synchronization signal.

5. The system of claim 4, and further comprising:
   a buffer circuit coupled to the output of the gate to buffer the digitalized video data signal output by the gate; and
   a decoder circuit coupled to the buffer circuit, the decoder circuit reading the digitalized video data signal from the buffer circuit to decode the video data.

6. The system of claim 3, and further comprising a decoder circuit coupled to receive the digitalized video data signal, wherein the control circuit varies the threshold of the digitalization circuit of the video signal between a maximum level and a minimum level for horizontal lines taken through a barcode such that the digitalization circuit generates a digitalized video data signal for each horizontal line at a different threshold, and wherein the decoder circuit decodes the digitalized video data signal for each horizontal line.

7. The system of claim 6, wherein the control circuit determines a contrast quality measurement of a barcode label based on an amount of deviation of the threshold for which the digitalized video data signals are decodable by the decoder circuit.

8. The system of claim 7, wherein the decoder circuit generates as output a decode success signal indicating that the digitalized video data signal for a horizontal line is decodable, the control logic circuit receiving as input the decode success signal output by the decoder circuit and counting the number of decode success signals generated by the decoder circuit for horizontal lines of a barcode label and generating a quality measurement signal based on the number of decode success signals received from the decoder circuit.

9. The system of claim 8, wherein the control circuit generates the quality measurement signal indicative of a good quality barcode label when the number of horizontal lines having a decodable digitalized video data signal exceeds a predetermined number.

10. The system of claim 3, and further comprising a gain controlled amplifier which amplifies the video signal for connection as input to the digitalization circuit, the control circuit generating a gain control signal for controlling a gain of the gain controlled amplifier based on the digitalized video data signals generated at each level of the threshold, so that an amplitude of the output of the gain controlled amplifier is at a level suitable for processing by the digitalization circuit.

11. The system of claim 1, and further comprising a masking circuit which masks the video signal for a predetermined portion of a video field.

12. The system of claim 11, wherein the masking circuit comprises a switch coupled to receive the video signal that opens or closes in response to a masking control signal, the control circuit generating the masking control signal so as to cause the switch to close when in a first state and to cause the switch to open when in a second state.

13. The system of claim 12, wherein the control circuit generates the masking control signal based on information defining which portions of the video field should be masked and which portion should be unmasked.

14. The system of claim 13, and further comprising a digitalization circuit which receives the video signal output by the video camera and generates as output a digitalized video data signal for each horizontal line of the video signal, and wherein the masking circuit receives as input the digitalized video data signal.

15. A system for processing video signals representing barcode labels, the system comprising:
   a sync separator circuit which extracts from the video signal a vertical synchronization signal comprising a sequence of pulses occurring at a predetermined frequency, each pulse representing a start of a video field of video data in the video signal, and a horizontal synchronization signal which comprises a sequence of pulses each of which represents a start of a horizontal line of a video field;
   a masking circuit coupled to receive as input the video signal and to selectively output of the video signal under control of a masking control signal; and
   a control circuit coupled to the masking circuit and to the sync separator circuit and receiving as input the vertical synchronization signal and the horizontal synchronization signal and generating the masking control signal coupled to the masking circuit to cause the masking circuit to inhibit output of the video signal for portions of the video field.

16. The system of claim 15, wherein the masking circuit comprises a switch coupled to the video signal which opens or closes in response to the masking control signal, the control circuit generating the masking control signal so as to cause the switch to close when in a first state and to cause the switch to open when in a second state.

17. The system of claim 16, wherein the control circuit generates the masking control signal based on information defining which portions of the video field should be masked and which portion should be unmasked.

18. A system for processing video signals representing barcode labels, the system comprising:
   a digitalization circuit having a first input for receiving a video signal output by a video camera and a second input for a threshold, the digitalization circuit comparing a level of the video signal with the threshold and generating as output a digitalized video data signal;
   a decoder circuit coupled to receive and decode the digitalized video data signal; and
   a control circuit coupled to the digitalization circuit which varies the threshold of the digitalization circuit between a maximum level and a minimum level for horizontal lines taken through a barcode such that the digitalization circuit generates a digitalized video signal for each horizontal line at a different threshold;
   wherein the control circuit determines a contrast quality measurement of a barcode label based upon an amount of deviation of the threshold of the digitalization circuit for which the decoder circuit successfully decodes the digitalized video data signal.

19. The system of claim 18, wherein the decoder circuit generates a decode success signal for each digitalized video data signal corresponding to a horizontal line that is decodable, and the control circuit counts a number of decode success signals for one barcode as a measure of the amount of deviation of the threshold.

20. The system of claim 19, wherein the control circuit generates a quality measurement signal based on the number of decode success signals received from the decoder circuit for a barcode image.

21. The system of claim 20, wherein the control circuit compares the number of decode success signals received from the decoder circuit for a barcode image with a predetermined number, and generates a good barcode label signal if the number of decode success signals received from the decoder circuit for a barcode image exceeds the predetermined number.

22. The system of claim 18, and further comprising a gain controlled amplifier which amplifies the video signal for connection as input to the digitalization circuit, the control circuit generating a gain control signal for controlling a gain of the gain controlled amplifier based on the digitalized video data signals generated at each level of the threshold, so that an amplitude of the output of the gain controlled amplifier is at a level suitable for processing by the digitalization circuit.

23. A system for processing video signals representing barcode labels, the system comprising:
   a sync separator circuit receiving as input a video signal representative of a plurality of barcode labels, and extracting a vertical synchronization signal and a horizontal synchronization signal from the video signal;
   a digitalization circuit receiving as input the video signal and comparing a level of the video signal with a threshold to generate as output a digitalized video data signal; and
   a width measurement circuit coupled to receive as input the digitalized video data signal, the horizontal synchronization signal and the vertical synchronization signal, the width measurement circuit generating width measurement data for a digitalized video data signal for each horizontal line and to output digitalized video data signals for those horizontal lines determined to have width measurement data consistent with a barcode.

24. The system of claim 23, and further comprising a decoder circuit coupled to receive the digitalized video data signal, and a control circuit connected to the digitalization circuit and decoder circuit, the control circuit varying the threshold of the digitalization circuit between a maximum level and a minimum level for horizontal lines taken through a barcode such that the digitalization circuit generates a digitalized video data signal for each horizontal line at a different threshold, and wherein the decoder circuit decodes the digitalized video data signal for each horizontal line.

25. The system of claim 24, wherein the control circuit determines the contrast quality measurement of a barcode label based on an amount of deviation of the threshold for which the digitalized video data signals are decodable by the decoder circuit.

26. The system of claim 24, wherein the decoder circuit generates as output a decode success signal indicating that the digitalized video signal for a horizontal line is decodable, the control circuit receiving as input the decode success signal output by the decoder circuit, counting the number of decode success signals generated by the decoder circuit for a barcode image and generating a quality measurement signal based on the number of horizontal lines having a decodable digitalized video data signal.

27. The system of claim 26, wherein the control circuit generates the quality measurement signal indicative of a good quality barcode label when the number of horizontal lines having a decodable digitalized video data signals exceeds a predetermined number.

28. The system of claim 24, and further comprising a gain controlled amplifier which amplifies the video signal for connection as input to the digitalization circuit, the control circuit generating a gain control signal for controlling a gain of the gain controlled amplifier based on the digitalized video data signals generated at each level of the threshold, so that an amplitude of the output of the gain controlled amplifier is at a level suitable for processing by the digitalization circuit.

29. A system for processing video signals representing barcode labels, the system comprising:

a sync separator circuit receiving the video signal and extracting a vertical synchronization signal and a horizontal synchronization signal;

a digitalization circuit having a first input for receiving the video signal and a second input for a threshold, the digitalization circuit comparing a level of the video signal with the threshold and generating as output a digitalized video data signal;

a width measurement circuit coupled to receive as input the digitalized video data signal, the horizontal synchronization signal and the vertical synchronization signal, the width measurement circuit generating width measurement data for each horizontal line and outputting digitalized video data signals for those horizontal lines determined to have width measurement data consistent with a barcode image;

a gate having one input coupled to the output of the width measurement circuit another input coupled to receive a gate trigger signal, and an output, the gate being responsive to the gate trigger signal to couple digitalized video data signals from the width measurement circuit to its output;

a decoder circuit coupled to the output of the gate for decoding digitalized video data signals output by the gate, the decoder decoding the digitalized video data signal associated with each horizontal line output by the gate to generate barcode label data and a decode success signal for each horizontal line of a barcode image that is decodable; and a control circuit receiving as input the vertical synchronization signal and the decode success signal, the control circuit generating the gate trigger signal synchronized to pulses in the vertical synchronization signal to control when the decoder circuit receives a digitalized video data signal to be decoded, the control circuit further counting a number of decode success signals received for horizontal lines of a barcode label as a measure of a contrast quality of the barcode label.

30. The system of claim 29, wherein the control circuit generates a pulse in the gate trigger signal which enables the gate to output the digitalized video data signal while the pulse in the gate trigger signal is present and otherwise not outputting the digitalized video data signals, the control circuit generating the pulse in the gate trigger signal in response to and immediately subsequent a pulse in the vertical synchronization signal.

31. The system of claim 30, wherein the control circuit varies the threshold of the digitalization circuit between a maximum level and a minimum level for horizontal lines of a barcode image such that the digitalization circuit generates a digitalized video data signal for each horizontal line at a different threshold, and wherein the decoder circuit decodes the digitalized video data signal for each horizontal line.

32. The system of claim 31, wherein the control circuit determines a contrast quality measurement of a barcode label based on an amount of deviation of the threshold for which the digitalized video data signals that are decodable by the decoder circuit.

33. The system of claim 31, wherein the decoder circuit generates as output a decode success signal indicating that the digitalized video data signal for a horizontal line is decodable, the control circuit receiving as input the decode success signal output by the decoder circuit, counting the number of decode success signals generated by the decoder circuit for a barcode image and generating a quality measurement signal based on the number of horizontal lines having a decodable digitalized video data signal.

34. The system of claim 33, wherein the control circuit generates the quality measurement signal indicative of a good quality barcode label when the number of horizontal lines having a decodable digitalized video data signal exceeds a predetermined number.

35. A method for processing video signals representing barcode labels, the method comprising steps of:

receiving from a video camera a video signal representing a plurality of barcode labels;

extracting from the video signal vertical synchronization signal which comprises a sequence of pulses occurring at a predetermined frequency, each pulse representing a start of a video field of video data in the video signal; and triggering a strobe device to flash in response to determining that a barcode label is present, wherein the strobe device is triggered with respect to a pulse in the vertical synchronization signal so as to flash at a time coincident with a next available video field integration period of the video camera.

36. The method of claim 35, and further comprising the steps of:

digitalizing the video signal from the camera for each horizontal scan lines taken through a barcode to generate a digitalized video data signal for each horizontal line;

supplying a digitalized video data signal to a decoder circuit, in response to and immediately subsequent a pulse in the vertical synchronization signal.

37. A method for measuring a quality of a barcode label based on a video signal representing a barcode label, the method comprising steps of:

generating a digitalized video data signal for each of the plurality of horizontal lines by comparing a level of the video signal for each of a plurality of horizontal lines through a barcode label with a different threshold;

determining whether the digitalized video data signal for each of the plurality of horizontal lines is decodable; and determining a contrast quality measurement of the barcode label based upon an number of horizontal lines determined to have a decodable digitalized video data signal.

38. The method of claim 37, wherein the step of determining a contrast quality measurement comprises comparing the number of horizontal lines determined to have a decodable digitalized video data signal with a predetermined number.

39. The method of claim 38, and further comprising the step of assigning a measure of quality to a barcode label based on the number of horizontal lines having a decodable digitalized video data signal for the barcode label.

40. The method of claim 37, and further comprising the step of varying a level of the threshold between a minimum and maximum synchronized to a horizontal synchronization signal of the video signal.

41. The method of claim 37, and further comprising the step of adjusting a level of the video signal before it is digitalized so that it has a substantially constant amplitude.

42. A method for processing video signals barcode labels comprising steps of:

comparing a level of the video signal for a plurality of horizontal lines of a barcode image with a threshold;

generating a digitalized video data signal for each of the plurality of horizontal lines;

examining the digitalized video data signal for width characteristics which are consistent with barcode data; and decoding the digitalized video data signal only if it is determined to have width characteristics consistent with barcode data.

43. A method for processing video signals representing barcode labels comprising steps of:

receiving a video signal including a vertical synchronization signal; and determining which part of a video field a single barcode label resides; and masking the video signal for portions of the video field determined not to contain the single barcode label image so as to process the video signal only for that part of the video field where the single barcode label image resides.

44. The method of claim 43, and further comprising the step of digitalizing the video signal for a plurality of horizontal lines for each video field, and wherein the step of masking the video signal comprise filtering out the digitalized video data signal for those horizontal lines outside of the part of the video field where the single barcode label resides.

* * * * *